(12) United States Patent
Wang et al.

(10) Patent No.: US 12,345,801 B2
(45) Date of Patent: Jul. 1, 2025

(54) VELOCITY MEASUREMENT SIGNAL TRANSMISSION METHOD AND RECEIVING METHOD

(71) Applicant: SHENZHEN YINWANG INTELLIGENT TECHNOLOGIES CO., LTD., Shenzhen (CN)

(72) Inventors: Ben Wang, Beijing (CN); Dejian Li, Beijing (CN); Jintai Zhu, Beijing (CN); Dapeng Lao, Beijing (CN)

(73) Assignee: SHENZHEN YINWANG INTELLIGENT TECHNOLOGIES CO., LTD., Shenzhen (CN)

(*) Notice: Subject to any disclaimer, the term of this patent is extended or adjusted under 35 U.S.C. 154(b) by 567 days.

(21) Appl. No.: 17/703,081

(22) Filed: Mar. 24, 2022

(65) Prior Publication Data
US 2022/0214442 A1    Jul. 7, 2022

Related U.S. Application Data

(63) Continuation of application No. PCT/CN2019/107526, filed on Sep. 24, 2019.

(51) Int. Cl.
*G01S 13/58*    (2006.01)
*G01S 13/92*    (2006.01)
*H04B 1/69*     (2011.01)
*H04B 7/0413*   (2017.01)

(52) U.S. Cl.
CPC ............ *G01S 13/584* (2013.01); *G01S 13/92* (2013.01); *H04B 1/69* (2013.01); *H04B 7/0413* (2013.01); *H04B 2001/6912* (2013.01)

(58) Field of Classification Search
None
See application file for complete search history.

(56) References Cited

U.S. PATENT DOCUMENTS

| | | | |
|---|---|---|---|
| 9,933,520 B1 | 4/2018 | Campbell | |
| 2011/0013716 A1 | 1/2011 | Brodzik et al. | |
| 2012/0106613 A1 | 5/2012 | Piazza et al. | |

(Continued)

FOREIGN PATENT DOCUMENTS

| CN | 101039497 A | 9/2007 |
|---|---|---|
| CN | 102362439 A | 2/2012 |

(Continued)

OTHER PUBLICATIONS

Xueyao Hu et al., "Motion compensation for Tdm Mimo radar by sparse reconstruction",Electronics Letters Nov. 23, 2017 vol. 53 No. 24 pp. 1604-1606, 2 pages.

(Continued)

*Primary Examiner* — Marcus E Windrich
(74) *Attorney, Agent, or Firm* — Conley Rose, P.C.

(57) ABSTRACT

A velocity measurement signal transmission and receiving method for an intelligent driving system includes generating a plurality of chirp signals for measuring moving velocities of one or more moving targets (301); and transmitting the plurality of chirp signals in a time-division multiplexing (TDM) repetition cycle by using M antennas (302), where the TDM repetition cycle includes one single-antenna transmit mode sub-cycle and L consecutive multi-antenna transmit mode sub-cycles.

16 Claims, 11 Drawing Sheets

(56) References Cited

U.S. PATENT DOCUMENTS

| | | | | |
|---|---|---|---|---|
| 2012/0296567 | A1* | 11/2012 | Breed | E05F 15/77 |
| | | | | 701/468 |
| 2014/0347211 | A1 | 11/2014 | Schoor et al. | |
| 2015/0204972 | A1* | 7/2015 | Kuehnle | G01S 13/42 |
| | | | | 342/156 |
| 2017/0293027 | A1* | 10/2017 | Stark | G01S 13/87 |
| 2018/0156911 | A1 | 6/2018 | Pokrass et al. | |
| 2018/0252809 | A1 | 9/2018 | Davis et al. | |
| 2019/0242972 | A1 | 8/2019 | Melzer et al. | |
| 2020/0025906 | A1* | 1/2020 | Kesaraju | G01S 13/931 |
| 2020/0191936 | A1* | 6/2020 | Witter | G01S 13/584 |
| 2021/0318413 | A1* | 10/2021 | Arkind | G01S 13/42 |
| 2022/0171050 | A1* | 6/2022 | Liu | G01S 7/006 |

FOREIGN PATENT DOCUMENTS

| | | |
|---|---|---|
| CN | 104181517 A | 12/2014 |
| CN | 104793192 A | 7/2015 |
| CN | 108152809 A | 6/2018 |
| CN | 108387877 A | 8/2018 |
| CN | 108594233 A | 9/2018 |
| CN | 110133602 A | 8/2019 |
| EP | 2463683 A1 | 6/2012 |
| WO | 2021031076 A1 | 2/2021 |

OTHER PUBLICATIONS

Piya Pal et al., "Nested Arrays: A Novel Approach to Array Processing With Enhanced Degrees of Freedom," IEEE Transactions on Signal Processing, vol. 58, No. 8, Aug. 2010, 15 pages.

Zhang Xiangyang et al., "Range-dependent Beamforming with Frequency Diversity Uniform Circular Array MIMO Radar," Modern Radar, vol. 37, No. 11, Nov. 2015, with an English abstract, 6 pages.

* cited by examiner

701 — Receive, by using a plurality of antennas, received signals reflected by one or more moving targets, where the received signals includes chirp signals in one or more time division multiplexing repetition cycles, each time division multiplexing repetition cycle includes one single-antenna transmit mode sub-cycle and L consecutive multi-antenna transmit mode sub-cycles, each single-antenna transmit mode sub-cycle includes N frequency sweep cycles, each multi-antenna transmit mode sub-cycle includes M frequency sweep cycles, and N chirp signals in the N frequency sweep cycles and a chirp signal in the K-th frequency sweep cycle in the M frequency sweep cycles are transmitted by a same antenna, where L, M, N, and K are all positive integers, and both M and N are greater than 1

702 — For a received signal received by each of the plurality of antennas, sample a chirp signal in one of the one or more time division multiplexing repetition cycles by using the frequency sweep cycle as a sampling cycle, to obtain data corresponding to N+L sampling points, where the N+L sampling points are respectively in the N frequency sweep cycles in the single-antenna transmit mode sub-cycle and the K-th frequency sweep cycle in each of the L consecutive multi-antenna transmit mode sub-cycles 703 — Construct a target vector by using the data corresponding to the N+L sampling points corresponding to each of the plurality of antennas 704 — Construct a target matrix X by using a plurality of target vectors of the plurality of antennas 705 — Calculate a covariance matrix R of the target matrix X 706 — Sequentially extract a plurality of elements in the matrix R in an order of exponential coefficients of the plurality of elements, and form a vector r by using the plurality of elements 707 — Calculate a velocity spectrum about moving velocities of the one or more targets based on the vector r

FIG. 7

One time division multiplexing repetition cycle

VELOCITY MEASUREMENT SIGNAL TRANSMISSION METHOD AND RECEIVING METHOD

CROSS-REFERENCE TO RELATED APPLICATIONS

This application is a continuation of International Application No. PCT/CN2019/107526, filed on Sep. 24, 2019, which is hereby incorporated by reference in its entirety.

TECHNICAL FIELD

This application relates to velocity measurement technologies, and in particular, to a velocity measurement signal transmission method and receiving method.

BACKGROUND

Velocity measurement includes measuring moving velocities of targets such as a pedestrian, an animal, a motor vehicle, a non-motor vehicle, a train, and an aircraft, and is an important research field of intelligent driving. In practical application, a sensor (such as a millimeter wave radar or a laser radar) that can transmit a velocity measurement signal and receive a velocity measurement signal reflected back by a target is usually used to measure a velocity. The velocity measurement mainly uses the Doppler effect principle: When the target approaches the sensor, a reflected signal frequency is higher than a transmit frequency. Conversely, when the target moves away from the sensor, a reflected signal frequency is lower than a transmit frequency. In this way, a relative velocity between the target and the sensor can be calculated by using a change value of the frequency.

A chirp signal is a common velocity measurement signal, and its frequency changes with time. The change may be a frequency increase or a frequency decrease, and may be a linear change, or may be a non-linear change. If such a signal is converted into audio, it sounds like chirps of a bird, and therefore, the signal is called a chirp signal.

A frequency-modulated continuous waveform (FMWC) is a common waveform of chirp signals (for a frequency change of the waveform with time, refer to FIG. 1), and may be obtained by modulating a carrier (such as a cosine wave, a triangular wave, a sawtooth wave, or a pulse square wave) by using a time function as in shown in formula 1.

$$f(t)=f_0+\gamma t \quad \text{(Formula 1)}$$

$f_0$ is an initial frequency, $\gamma$ is a chirp rate, $t \in [0, T_c]$, and $T_c$ is a frequency sweep cycle. A plurality of consecutive chirp signals in a form of the frequency modulated continuous waveform shown in FIG. 1 are used as an example to describe a velocity measurement principle.

If a carrier of the FMCW is a cosine signal, a time domain waveform of a chirp signal is:

$$x(t) = e^{j2\pi\left(f_0 t + \frac{\gamma t^2}{2}\right)} \quad \text{(Formula 2)}$$

Assuming that there is a target with an initial distance $r_0$ and a velocity $v$, a reflected signal delay of the $n_T^{th}$ chirp signal may be represented as $$\tau_{n_T} = \frac{2(r_0 + n_T T_c v)}{c}, \quad \text{(Formula 3)}$$

where $c$ is the velocity of light.

A corresponding received signal may be represented as $x'(n_T, t) = x(t - \tau_{n_T}) + n(t)$ (Formula 4), where $n(t)$ is a noise signal.

Frequency mixing is performed on a transmitted signal and a reflected signal, and output of a frequency mixer is represented as shown in Formula 5.

$$y(n_T, t) = [x'(n_T, t)]^* x(t) \quad \text{(Formula 5)}$$
$$= e^{j2\pi\left[f_0 \tau_{n_T} + \gamma t \tau_{n_T} - \frac{\gamma \tau_{n_T}^2}{2}\right]}$$
$$= e^{j2\pi\left[f_0 \tau_{n_T} + \gamma t \tau_{n_T} - \frac{\gamma \tau_{n_T}^2}{2}\right]}$$

A value of $\tau_{n_T}^2$ is very small. Therefore, this term may be ignored, and Formula 5 may be simplified as shown in formula 6.

$$y(n_T, t) = e^{j4\pi\left[f_0 \frac{(r_0 + n_T T_c v)}{c} + \gamma t \frac{(r_0 + n_T T_c v)}{c}\right]} \quad \text{(Formula 6)}$$
$$= e^{j4\pi\left[\frac{f_0 r_0}{c} + \frac{f_0 n_T T_c v}{c} + \frac{\gamma t r_0}{c} + \frac{\gamma t n_T T_c v}{c}\right]}$$

Herein, $$\frac{f_0 r_0}{c}$$

is a constant term, and $$\frac{\gamma t n_T T_c v}{c}$$

is a cross term an may also be omitted. The output of the frequency mixer is further represented as shown in formula 7.

$$y(n_T, t) = e^{j4\pi\left[\frac{f_0 n_T T_c v}{c} + \frac{\gamma t r_0}{c}\right]} = e^{j\frac{4\pi \gamma t r_0}{c}} e^{j2\pi \frac{2f_0 v}{c} n_T T_c} \quad \text{(Formula 7)}$$

Considering that a Doppler frequency is defined as $$f_d = \frac{2v f_0}{c},$$

Formula 7 is further simplified as shown in formula 8.

$$y(n_T, t) = e^{j4\pi\left[\frac{f_0 n_T T_c v}{c} + \frac{\gamma t r_0}{c}\right]} = e^{j\frac{4\pi \gamma t r_0}{c}} e^{j2\pi f_d n_T T_c} \quad \text{(Formula 8)}$$

In consideration of only a velocity term, this part is discrete sampling performed on a sinusoidal signal with a frequency $f_d$ by using a sampling cycle as the frequency sweep cycle $T_c$. In consideration of the Nyquist sampling theorem, it is required that $$f_d < \frac{1}{2T_c}.$$

Therefore, after the sampling cycle is determined as $T_c$, a maximum velocity measurement range is determined, and a maximum velocity estimation value is shown in Formula 9.

$$v_{max} = \frac{c}{4T_c f_0}. \quad \text{(Formula 9)}$$

A time division multiplexing (TDM) mode has advantages such as simple hardware implementation and low mutual coupling effect, and is an important research direction for the radar. The foregoing velocity measurement method may be based on a single-input multiple-output (SIMO) mode or a multiple-input multiple-output (MIMO) mode. From Formula 9, the following can be learned.

In the SIMO mode, only a single transmit antenna transmits a chirp signal, the sampling cycle $T_c$ is a single frequency sweep cycle, and a velocity estimation range is the largest. However, in the SIMO mode, an additional virtual array aperture cannot be obtained, and consequently, angular resolution is reduced.

In the MIMO mode, it is assumed that there are $M_T$ transmit antennas, and the transmit antennas transmit chirp signals in turn, so that a relatively large virtual aperture can be obtained, and angular resolution can be greatly improved. However, the sampling cycle increases to $M_T T_c$. This causes a decrease of the maximum velocity measurement range by an $M_T$ multiple, and velocity estimation is ambiguous.

A solution that can be easily implemented is useful to increase a maximum velocity measurement range and minimize entire velocity measurement signal duration while a relatively large virtual aperture is retained.

SUMMARY

To overcome the foregoing problems in the conventional technology, embodiments of the present disclosure provide a velocity measurement signal transmission method and receiving method.

According to a first aspect, a velocity measurement signal transmission method is provided, including: generating a plurality of chirp signals for measuring moving velocities of one or more moving targets; and transmitting the plurality of chirp signals in a TDM repetition cycle by using M antennas. The TDM repetition cycle includes one single-antenna transmit mode sub-cycle and L consecutive multi-antenna transmit mode sub-cycles. The single-antenna transmit mode sub-cycle includes N frequency sweep cycles, and N chirp signals in the N frequency sweep cycles are transmitted by one of the M antennas, or are simultaneously transmitted by at least two of the M antennas, where there is a delay between the at least two antennas. Each multi-antenna transmit mode sub-cycle includes M frequency sweep cycles, and M chirp signals in the M frequency sweep cycles are respectively transmitted in order by the M antennas. M and N are positive integers greater than 1, and L is a positive integer.

Optionally, the delay between the at least two antennas is a relatively low delay, is preferably an integer multiple of a fast sampling cycle Ts, and is used to offset a signal transmission path length difference caused by an antenna position difference, so that simultaneously transmitting velocity measurement signals by the at least two antennas can be considered, in terms of effect, as transmitting the velocity measurement signals by one antenna. This avoids a field of view decrease caused by an undesired beamforming effect, and greatly increases a signal-to-noise ratio). The order includes a preset order or a randomly generated order, and orders in the L multi-antenna transmit mode sub-cycles are the same. According to the foregoing transmission method in which SIMO and MIMO are combined, a maximum velocity measurement range can be increased and entire velocity measurement signal duration can be minimized while a relatively large virtual aperture is retained.

According to the first aspect, in a first possible implementation of the velocity measurement signal transmission method, a ratio of N to L is greater than a first threshold.

According to the first aspect or the first possible implementation of the first aspect, in a second possible implementation of the velocity measurement signal transmission method, values of L, M, and N should ensure that a ratio of a quantity of 0s to a quantity of non-0 values in a weight function w does not exceed a second threshold, the weight function $w=c \otimes c^-$, c is a vector that includes N+L×M elements, $c^-$ represents vector inversion of c, $\otimes$ represents a linear convolution operation of the vector, the N+L×M elements correspond to transmit antennas of N+L×M chirp signals in one TDM repetition cycle starting from the single-antenna transmit mode sub-cycle or the L consecutive multi-antenna transmit mode sub-cycles, an element corresponding to a transmit antenna in the single-antenna transmit mode sub-cycle is 1, and elements corresponding to the other M−1 antennas than the transmit antenna in the single-antenna transmit mode sub-cycle are 0s.

According to any one of the first aspect or the implementations of the first aspect, in a third possible implementation of the velocity measurement signal transmission method, a time interval between the single-antenna transmit mode sub-cycle and the multi-antenna transmit mode sub-cycle is zero, or is an integer multiple of the frequency sweep cycle.

According to any one of the first aspect or the implementations of the first aspect, in a fourth possible implementation of the velocity measurement signal transmission method, the transmit antenna in the single-antenna transmit mode sub-cycle transmits the $(K+1)^{th}$ chirp signal in the multi-antenna transmit mode sub-cycle, where K is an integer greater than or equal to 0, and a relationship among M, N, and K satisfies: if K=0, N≥M"1; if 0≤K≤M, N>M; or if K>M, N≥K+1.

In the foregoing four implementations, limitations on M, N, L, K, and the time interval between the single-antenna transmit mode sub-cycle and the multi-antenna transmit mode sub-cycle are all intended to increase a maximum velocity measurement range as much as possible while a relatively large virtual aperture is retained.

According to a second aspect, a velocity measurement signal transmission apparatus is provided, including: a measurement signal generation module configured to generate a plurality of chirp signals for measuring moving velocities of one or more moving targets; and a transmission module configured to transmit the plurality of chirp signals in a TDM repetition cycle by using M antennas. The TDM repetition cycle includes one single-antenna transmit mode sub-cycle and L consecutive multi-antenna transmit mode sub-cycles. The single-antenna transmit mode sub-cycle includes N frequency sweep cycles of the chirp signals, and chirp signals in the N frequency sweep cycles are transmitted by one of the M antennas, or are simultaneously transmitted by at least two of the M antennas, where there is a delay between the at least two antennas. Each multi-antenna transmit mode sub-cycle includes M frequency sweep cycles of the chirp signals, and chirp signals in the M frequency sweep cycles are respectively transmitted in order by the M antennas. M and N are positive integers greater than 1, and L is a positive integer.

Optionally, the delay between the at least two antennas is a relatively low delay, is preferably an integer multiple of a fast sampling cycle Ts, and is used to offset a signal transmission path length difference caused by an antenna position difference, so that simultaneously transmitting velocity measurement signals by the at least two antennas can be considered, in terms of effect, as transmitting the velocity measurement signals by one antenna. This avoids a field of view (FOV) decrease caused by an undesired beamforming (BF) effect, and greatly increases an SNR a signal to noise ratio. The order includes a preset order or a randomly generated order, and orders in the L multi-antenna transmit mode sub-cycles are the same. According to the foregoing transmission apparatus in which SIMO and MIMO are combined, a maximum velocity measurement range can be increased and entire velocity measurement signal duration can be minimized while a relatively large virtual aperture is retained.

According to the second aspect, in a first possible implementation of the velocity measurement signal transmission apparatus, a ratio of N to L is greater than a first threshold.

According to the second aspect or the first possible implementation of the second aspect, in a second possible implementation of the velocity measurement signal transmission apparatus, values of L, M, and N should ensure that a ratio of a quantity of 0s to a quantity of non-0 values in a weight function w does not exceed a second threshold, the weight function $w=c \otimes c^-$, c is a vector that includes $N+L \times M$ elements, $c^-$ represents vector inversion of c, $\otimes$ represents a linear convolution operation of the vector, the $N+L \times M$ elements correspond to transmit antennas of $N+L \times M$ chirp signals in one TDM repetition cycle starting from the single-antenna transmit mode sub-cycle or the L consecutive multi-antenna transmit mode sub-cycles, an element corresponding to a transmit antenna in the single-antenna transmit mode sub-cycle is 1, and elements corresponding to the other M−1 antennas than the transmit antenna in the single-antenna transmit mode sub-cycle are 0s.

According to any one of the second aspect or the implementations of the second aspect, in a third possible implementation of the velocity measurement signal transmission apparatus, a time interval between the single-antenna transmit mode sub-cycle and the multi-antenna transmit mode sub-cycle is zero, or is an integer multiple of the frequency sweep cycle of the chirp signals.

According to any one of the second aspect or the implementations of the second aspect, in a fourth possible implementation of the velocity measurement signal transmission apparatus, the transmit antenna in the single-antenna transmit mode sub-cycle transmits the $(K+1)^{th}$ chirp signal in the multi-antenna transmit mode sub-cycle, where K is an integer greater than or equal to 0, and a relationship among M, N, and K satisfies: if K=0, N≥M−1; if 0<K≤M, N≥M; or if K>M, N≥K+1.

In the foregoing four implementations, limitations on M, N, L, K, and the time interval between the single-antenna transmit mode sub-cycle and the multi-antenna transmit mode sub-cycle are all intended to increase a maximum velocity measurement range as much as possible while a relatively large virtual aperture is retained.

According to a third aspect, a velocity measurement signal receiving method is provided, including: receiving, by using a plurality of antennas, received signals reflected by one or more moving targets, where the received signals include chirp signals in one or more TDM repetition cycles, each TDM repetition cycle includes one single-antenna transmit mode sub-cycle and L consecutive multi-antenna transmit mode sub-cycles, each single-antenna transmit mode sub-cycle includes N frequency sweep cycles, each multi-antenna transmit mode sub-cycle includes M frequency sweep cycles, and N chirp signals in the N frequency sweep cycles and a chirp signal in the $K^{th}$ frequency sweep cycle in the M frequency sweep cycles are transmitted by a same antenna, where L, M, N, and K are all positive integers, and both M and N are greater than 1; for a received signal received by each of the plurality of antennas, sampling a chirp signal in one of the one or more TDM repetition cycles by using the frequency sweep cycle as a sampling cycle, to obtain data corresponding to N+L sampling points, where the N+L sampling points are respectively in the N frequency sweep cycles in the single-antenna transmit mode sub-cycle and the $K^{th}$ frequency sweep cycle in each of the L consecutive multi-antenna transmit mode sub-cycles; constructing a target vector by using the data corresponding to the N+L sampling points corresponding to each of the plurality of antennas; constructing a target matrix X by using a plurality of target vectors of the plurality of antennas; calculating a covariance matrix R of the target matrix X; sequentially extracting a plurality of elements in the matrix R in an order of exponential coefficients of the plurality of elements, and forming a vector r by using the plurality of elements; and calculating a velocity spectrum about moving velocities of the one or more targets based on the vector r. According to the foregoing method for selecting a sampling point and method for processing data corresponding to the sampling point, a maximum velocity measurement range can be increased and entire velocity measurement signal duration can be minimized while a relatively large virtual aperture is retained.

According to the third aspect, in a first possible implementation of the velocity measurement signal receiving method, the calculating a velocity spectrum about moving velocities of the targets based on the vector r includes: calculating the velocity spectrum about the moving velocities of the one or more targets based on the vector r by using a fast Fourier transform (FFT), digital beamforming (DBF), or multiple signal classification (MUSIC) algorithm.

According to the third aspect or the first possible implementation of the third aspect, in a second possible implementation of the velocity measurement signal receiving method, the forming a vector r by using the plurality of elements includes: if at least two of the plurality of elements correspond to a same exponential coefficient, calculating an average value of the at least two elements as an element for forming the vector r, or selecting one of the at least two elements as an element for forming the vector r.

According to a fourth aspect, a velocity measurement signal receiving apparatus is provided, including: a receiving module configured to receive, by using a plurality of antennas, a received signal reflected by one or more moving targets, where the received signal includes a chirp signal in one or more TDM repetition cycles, each TDM repetition cycle includes one single-antenna transmit mode sub-cycle and L consecutive multi-antenna transmit mode sub-cycles, each single-antenna transmit mode sub-cycle includes N frequency sweep cycles, each multi-antenna transmit mode sub-cycle includes M frequency sweep cycles, and N chirp signals in the N frequency sweep cycles and a chirp signal in the $K^{th}$ frequency sweep cycle in the M frequency sweep cycles are transmitted by a same antenna, where L, M, N, and K are all positive integers, and both M and N are greater than 1; a data obtaining module configured to: for a received signal received by each of the plurality of antennas, sample a chirp signal in one of the one or more TDM repetition cycles by using the frequency sweep cycle as a sampling cycle, to obtain data corresponding to N+L sampling points, where the N+L sampling points are respectively in the N frequency sweep cycles in the single-antenna transmit mode sub-cycle and the $K^{th}$ frequency sweep cycle in each of the L consecutive multi-antenna transmit mode sub-cycles; a target vector construction module configured to construct a target vector by using the data corresponding to the N+L sampling points corresponding to each of the plurality of antennas; a target matrix construction module configured to construct a target matrix X by using a plurality of target vectors of the plurality of antennas; a covariance calculation module configured to calculate a covariance matrix R of the target matrix X; a vector construction module configured to sequentially extract a plurality of elements in the matrix R in an order of exponential coefficients of the plurality of elements, and form a vector r by using the plurality of elements; and a velocity spectrum calculation module configured to calculate a velocity spectrum about moving velocities of the one or more targets based on the vector r. In the velocity measurement signal receiving apparatus with the foregoing structure, a maximum velocity measurement range can be increased and entire velocity measurement signal duration can be minimized while a relatively large virtual aperture is retained.

According to the fourth aspect, in a first possible implementation of the velocity measurement signal receiving apparatus, the calculating a velocity spectrum about moving velocities of the targets based on the vector r includes calculating the velocity spectrum about the moving velocities of the one or more targets based on the vector r by using a FFT, DBF, or MUSIC algorithm.

According to the fourth aspect or the first possible implementation of the fourth aspect, in a second possible implementation of the velocity measurement signal receiving apparatus, the forming a vector r by using the plurality of elements includes, if at least two of the plurality of elements correspond to a same exponential coefficient, calculating an average value of the at least two elements as an element for forming the vector r, or selecting one of the at least two elements as an element for forming the vector r.

According to a fifth aspect, a velocity measurement signal transmission apparatus is provided, including a memory and a processor. The memory stores computer program instructions, and the processor runs the computer program instructions to perform the velocity measurement signal transmission method in any one of the first aspect or the implementations of the first aspect.

According to a sixth aspect, a velocity measurement signal receiving apparatus is provided, including a memory and a processor. The memory stores computer program instructions, and the processor runs the computer program instructions to perform the velocity measurement signal receiving method in any one of the third aspect or the implementations of the third aspect.

According to a seventh aspect, a computer storage medium is provided, including computer instructions. When the computer instructions are run by a processor, a transmission apparatus is enabled to perform the velocity measurement signal transmission method in any one of the first aspect or the implementations of the first aspect.

According to an eighth aspect, a computer storage medium is provided, including computer instructions. When the computer instructions are run by a processor, a receiving apparatus is enabled to perform the velocity measurement signal receiving method in any one of the third aspect or the implementations of the third aspect.

According to a ninth aspect, a computer program product is provided. When the computer program product runs on a processor, a transmission apparatus is enabled to perform the velocity measurement signal transmission method in any one of the first aspect or the implementations of the first aspect.

According to a tenth aspect, a computer program product is provided. When the computer program product runs on a processor, a receiving apparatus is enabled to perform the velocity measurement signal receiving method in any one of the third aspect or the implementations of the third aspect.

According to an eleventh aspect, a vehicle is provided, including the M antennas and the transmission apparatus in any one of the second aspect and the implementations of the second aspect or the fifth aspect.

According to a twelfth aspect, a vehicle is provided, including the plurality of antennas and the receiving apparatus in any one of the fourth aspect and the implementations of the fourth aspect or the sixth aspect.

According to a thirteenth aspect, a radar is provided, including the M antennas and the transmission apparatus in any one of the second aspect and the implementations of the second aspect or the fifth aspect.

According to a fourteenth aspect, a radar is provided, including the plurality of antennas and the receiving apparatus in any one of the fourth aspect and the implementations of the fourth aspect or the sixth aspect.

BRIEF DESCRIPTION OF DRAWINGS

To describe the technical solutions in embodiments of the present disclosure or in other approaches more clearly, the following briefly describes the accompanying drawings for describing embodiments or other approaches. The accompanying drawings in the following description show some embodiments of the present disclosure, and a person of ordinary skill in other approaches may still derive other drawings from these accompanying drawings without creative efforts.

FIG. 7 is a flowchart of a velocity measurement signal receiving method according to Embodiment 3 of the present disclosure;

DESCRIPTION OF EMBODIMENTS

To make the objectives, technical solutions, and advantages of embodiments of the present disclosure clearer, the following describes the technical solutions in embodiments of the present disclosure with reference to the accompanying drawings in embodiments of the present disclosure. The described embodiments are some but not all of embodiments of the present disclosure. All other embodiments obtained by a person of ordinary skill in other approaches based on embodiments of the present disclosure without creative efforts shall fall within the protection scope of the present disclosure.

Figure 1:
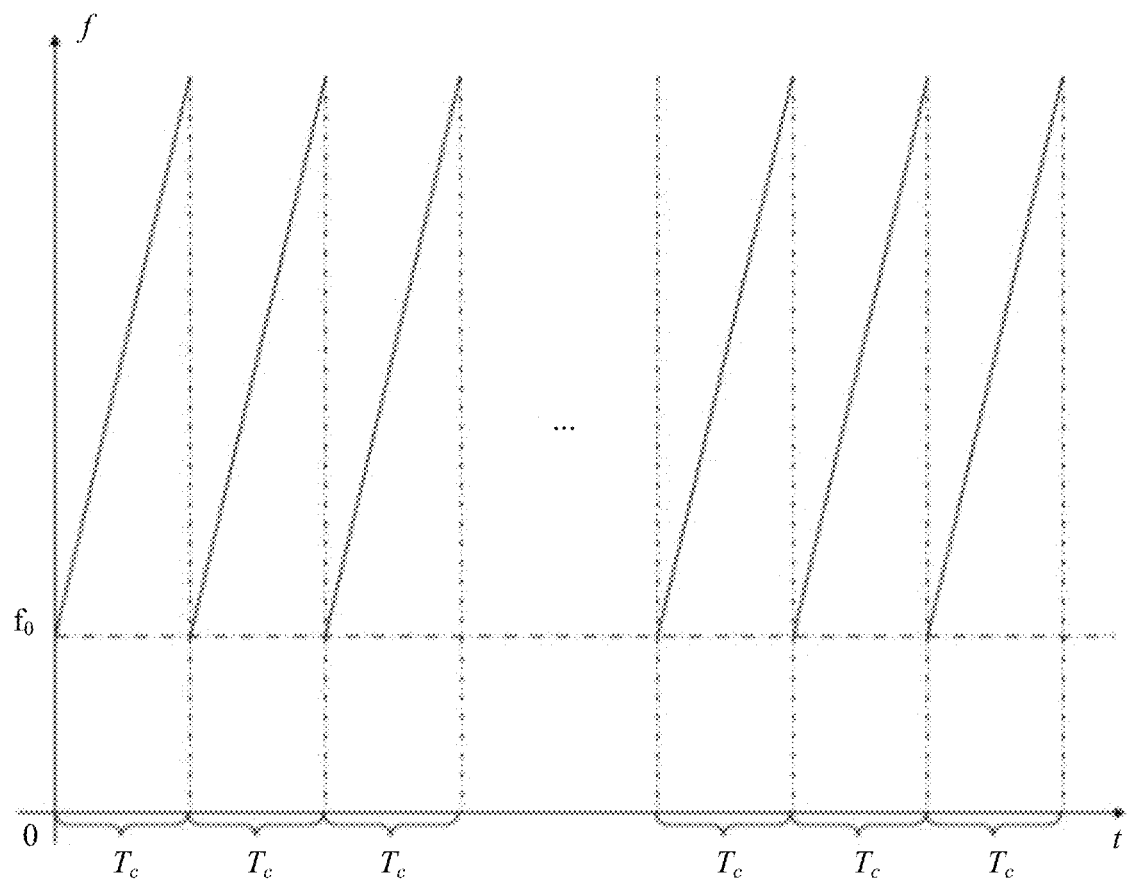
FIG. 1 is a schematic diagram of a situation of a change, with time, of frequencies of a plurality of consecutive chirp signals that are in a form of a frequency modulated continuous wave and that are used for velocity measurement in the conventional technology.
Figure 2:
FIG. 2 is a schematic diagram of a typical application scenario of velocity measurement according to embodiments of the present disclosure.

FIG. 2 is a schematic diagram of a typical application scenario of velocity measurement according to embodiments of the present disclosure. A velocity measurement scenario of outdoor road traffic is shown in the figure. A velocity measurement device transmits velocity measurement signals to one or more moving targets, for example, a vehicle traveling on a road or a walking pedestrian. The one or more moving targets reflect the velocity measurement signals. Digital signal processing is performed, based on a Doppler effect principle, on velocity measurement signals reflected back to the velocity measurement device, to obtain moving velocities of the one or more moving targets. In addition to the outdoor road traffic scenario shown in FIG. 2, the embodiments of the present disclosure may be further used for indoor obstacle avoidance, rail traffic, air flight, and road traffic scenarios in a plurality of road forms. The moving target includes but is not limited to a pedestrian, an animal, a motor vehicle, a non-motor vehicle, a train, a subway, or an aircraft.

Figure 3:
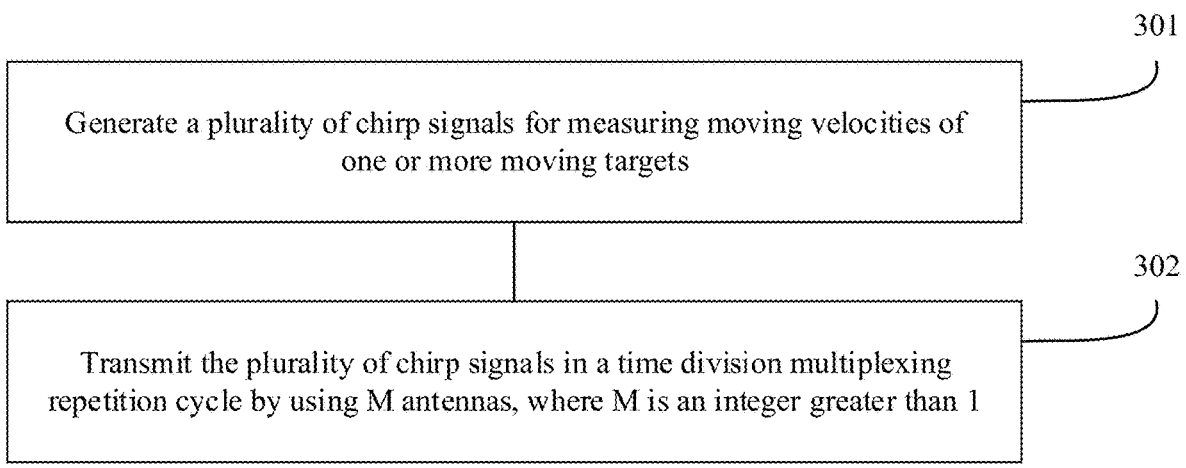
FIG. 3 is a flowchart of a velocity measurement signal transmission method according to Embodiment 1 and Embodiment 2 of the present disclosure.

Embodiment 1 of the present disclosure provides a velocity measurement signal transmission method. As shown in FIG. 3, the method includes the following steps.

Step 301: Generate a plurality of chirp signals for measuring moving velocities of one or more moving targets.

Step 302: Transmit the plurality of chirp signals in a TDM repetition cycle by using M antennas.

Figure 4:
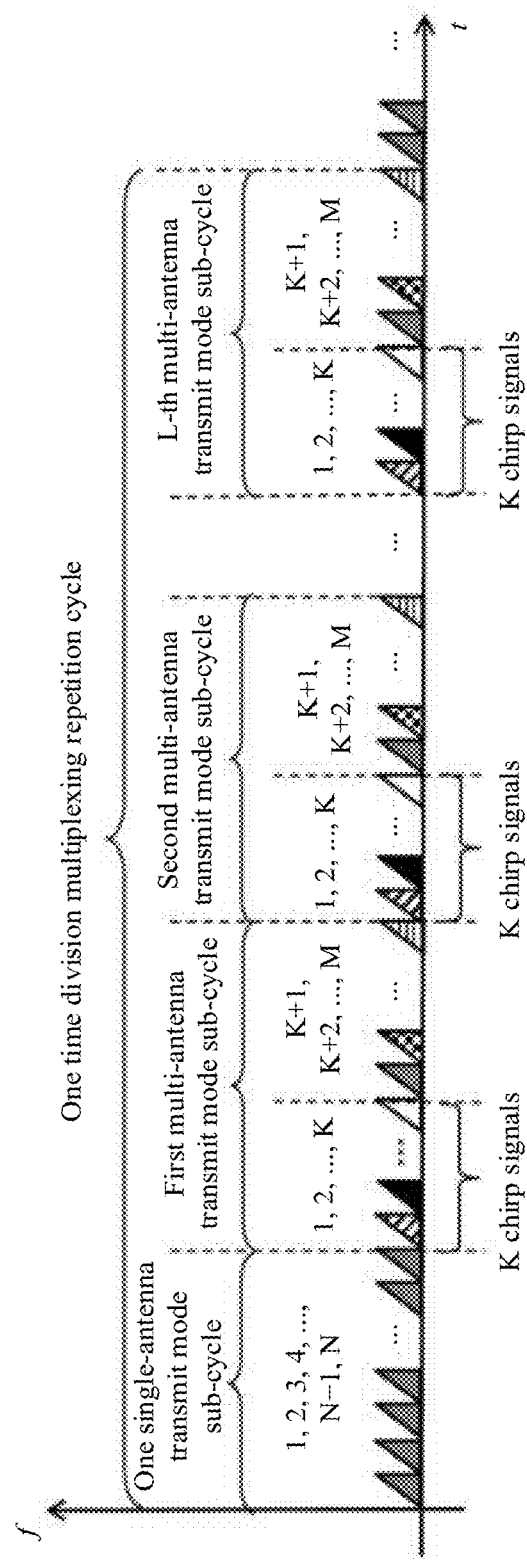
FIG. 4 is a schematic diagram in which M antennas transmit a plurality of chirp signals in a TDM repetition cycle according to Embodiment 1 of the present disclosure.

In Embodiment 1, a manner for transmitting the plurality of chirp signals in the TDM repetition cycle by using the M antennas is shown in FIG. 4. Each TDM repetition cycle includes one single-antenna transmit mode sub-cycle and L consecutive multi-antenna transmit mode sub-cycles (each TDM repetition cycle may start from one single-antenna transmit mode sub-cycle, as shown in FIG. 4, or may start from L consecutive multi-antenna transmit mode sub-cycles). The single-antenna transmit mode sub-cycle includes N frequency sweep cycles, and N chirp signals in the N frequency sweep cycles are transmitted by one of the M antennas (the chirp signals transmitted by the antenna is filled with gray in FIG. 4). The transmit antenna used in the single-antenna transmit mode sub-cycle may also be used for sending at least once in each multi-antenna transmit mode sub-cycle. Each multi-antenna transmit mode sub-cycle includes M frequency sweep cycles, M chirp signals in the M frequency sweep cycles are respectively transmitted in order by the M antennas, the order includes a preset order or a randomly generated order, and orders of the L multi-antenna transmit mode sub-cycles are the same. In FIG. 4, the transmit antenna in the single-antenna transmit mode sub-cycle always transmits the $(K+1)^{th}$ chirp signal in the multi-antenna transmit mode sub-cycle. M and N are integers greater than 1, L is a positive integer, and K is an integer greater than or equal to 0.

The four parameters M, N, L, and K may be optimized, or a limitation on a time interval between the single-antenna transmit mode sub-cycle and the multi-antenna transmit mode sub-cycle may be properly set, to increase a maximum velocity measurement range as much as possible while a relatively large virtual aperture is retained. Embodiment 1 includes the following several preferred setting manners.

In a first manner, a ratio of N to L is greater than a first threshold. A value of the first threshold should ensure that no obvious target ambiguity caused due to undersampling of a slow sampling part in a Doppler dimension occurs in a target part of a Doppler profile.

In a second manner, values of L, M, and N should ensure that a ratio of a quantity of 0s to a quantity of non-0 values in a weight function w does not exceed a second threshold, the weight function $w=c \otimes c^-$, c is a vector that includes N+L×M elements, $c^-$ represents vector inversion of c, $\otimes$ represents a linear convolution operation of the vector, the N+L×M elements correspond to transmit antennas of N+L×M chirp signals in one TDM repetition cycle, an element corresponding to a transmit antenna in the single-antenna transmit mode sub-cycle is 1, and elements corresponding to the other M−1 antennas than the transmit antenna in the single-antenna transmit mode sub-cycle are 0s.

In a third manner, a time interval between the single-antenna transmit mode sub-cycle and the multi-antenna transmit mode sub-cycle is zero, or is an integer multiple of the frequency sweep cycle.

In a fourth manner, a relationship among M, N, and K satisfies the following.

if $K=0, N \leq M-1$;

if $0 < K \leq M, N \geq M$; or if $K > M, N \geq K+1$.

Figure 5:
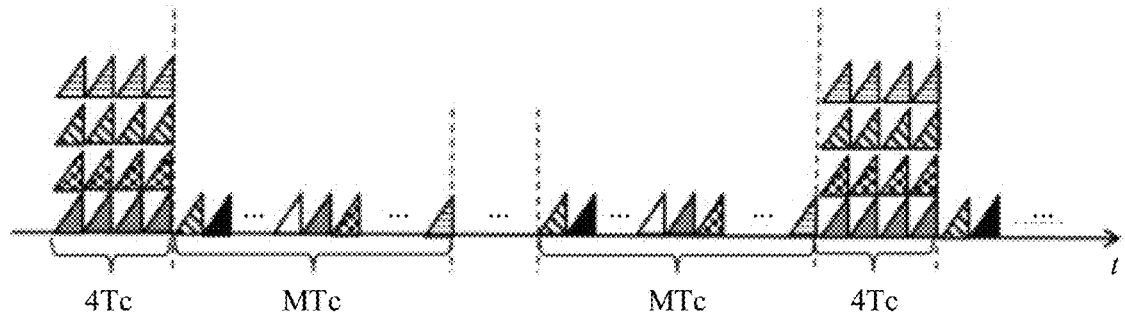
FIG. 5 is a schematic diagram in which M antennas transmit a plurality of chirp signals in a TDM repetition cycle according to Embodiment 2 of the present disclosure.

Embodiment 2 of the present disclosure provides another velocity measurement signal transmission method. Steps included in the method are also shown in FIG. 3. A difference between Embodiment 2 and Embodiment 1 is that the N chirp signals in the N frequency sweep cycles in the single-antenna transmit mode sub-cycle are simultaneously transmitted by at least two of the M antennas in Embodiment 2. FIG. 5 is an example diagram in which M antennas transmit a plurality of chirp signals in a TDM repetition cycle in Embodiment 2. In a single-antenna transmit mode sub-cycle, four antennas simultaneously send four chirp signals. In each multi-antenna transmit mode sub-cycle, the M antennas sequentially transmit M chirp signals, and a frequency sweep cycle of the chirp signals is $T_c$.

Figure 6:
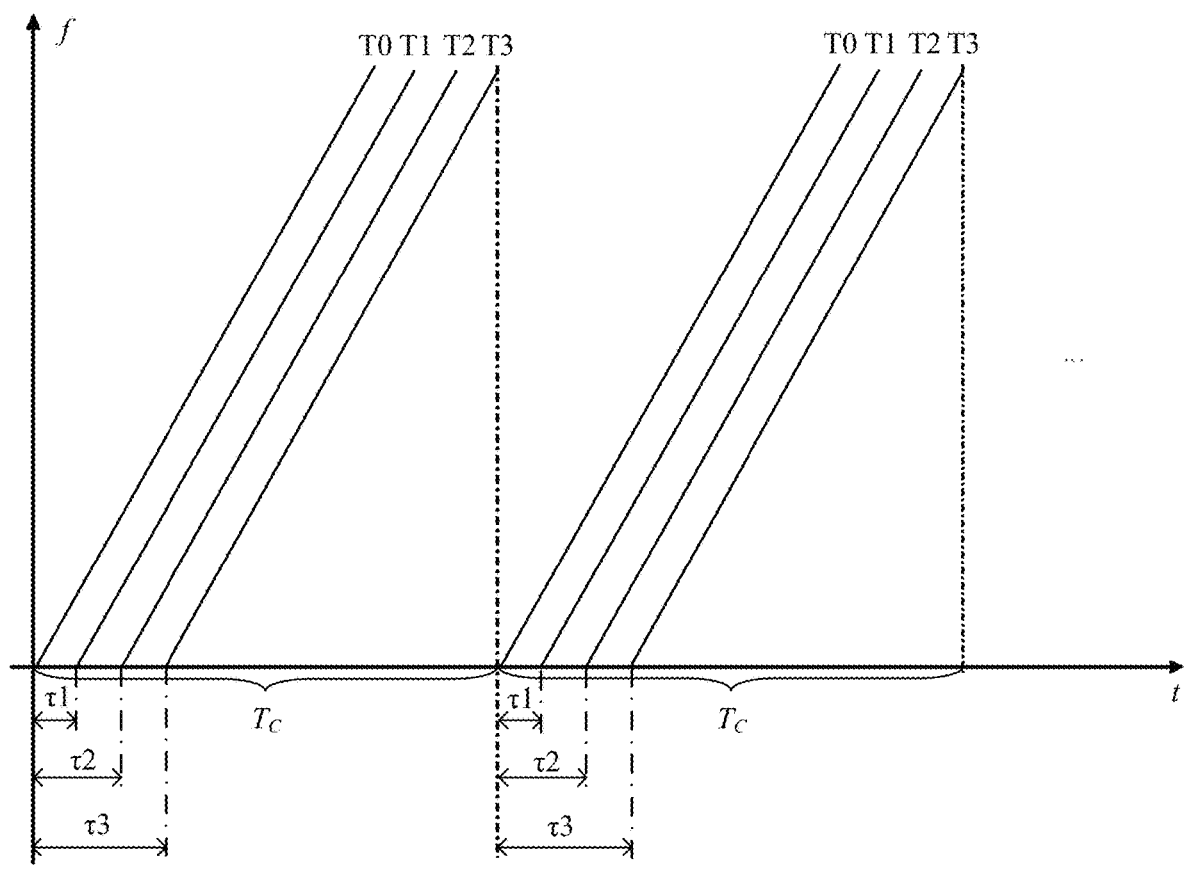
FIG. 6 is a schematic diagram of a delay of simultaneously sending a plurality of chirp signals by a plurality of antennas in a single-antenna transmit mode sub-cycle according to Embodiment 2 of the present disclosure.

To avoid an FOV) decrease caused by an undesired BF) effect, a low delay exists between the at least two antennas, and is used to offset a signal transmission path length difference caused by an antenna position difference, so that simultaneously transmitting velocity measurement signals by the at least two antennas can be considered, in terms of effect, as transmitting the velocity measurement signals by one antenna. In addition, SNR can be further greatly increased. FIG. 6 shows low delays between the four antennas simultaneously transmitting the four chirp signals in the single-antenna transmit mode sub-cycle in FIG. 5. The four antennas are respectively marked as T0, T1, T2, and T3, and delays of the antennas T1, T2, and T3 are respectively τ1, τ2, and τ3 relative to the reference antenna T0. In a preferred manner, a value of τ is an integer multiple of a fast sampling interval Ts.

According to the foregoing transmission method in which SIMO and MIMO are combined in Embodiment 1 and Embodiment 2, a maximum velocity measurement range can be increased and entire velocity measurement signal duration can be minimized while a relatively large virtual aperture is retained.

Embodiment 3 of the present disclosure provides a velocity measurement signal receiving method. As shown in FIG. 7, the method includes the following steps.

Step 701: Receive, by using a plurality of antennas, received signals reflected by one or more moving targets, where the received signals include chirp signals in one or more TDM repetition cycles, each TDM repetition cycle includes one single-antenna transmit mode sub-cycle and L consecutive multi-antenna transmit mode sub-cycles, each single-antenna transmit mode sub-cycle includes N frequency sweep cycles, each multi-antenna transmit mode sub-cycle includes M frequency sweep cycles, and N chirp signals in the N frequency sweep cycles and a chirp signal in the $K^{th}$ frequency sweep cycle in the M frequency sweep cycles are transmitted by a same antenna, where L, M, N, and K are all positive integers, and both M and N are greater than 1.

Step 702: For a received signal received by each of the plurality of antennas, sample a chirp signal in one of the one or more TDM repetition cycles by using the frequency sweep cycle as a sampling cycle, to obtain data corresponding to N+L sampling points, where the N+L sampling points are respectively in the N frequency sweep cycles in the single-antenna transmit mode sub-cycle and the $K^{th}$ frequency sweep cycle in each of the L consecutive multi-antenna transmit mode sub-cycles.

Figure 8:
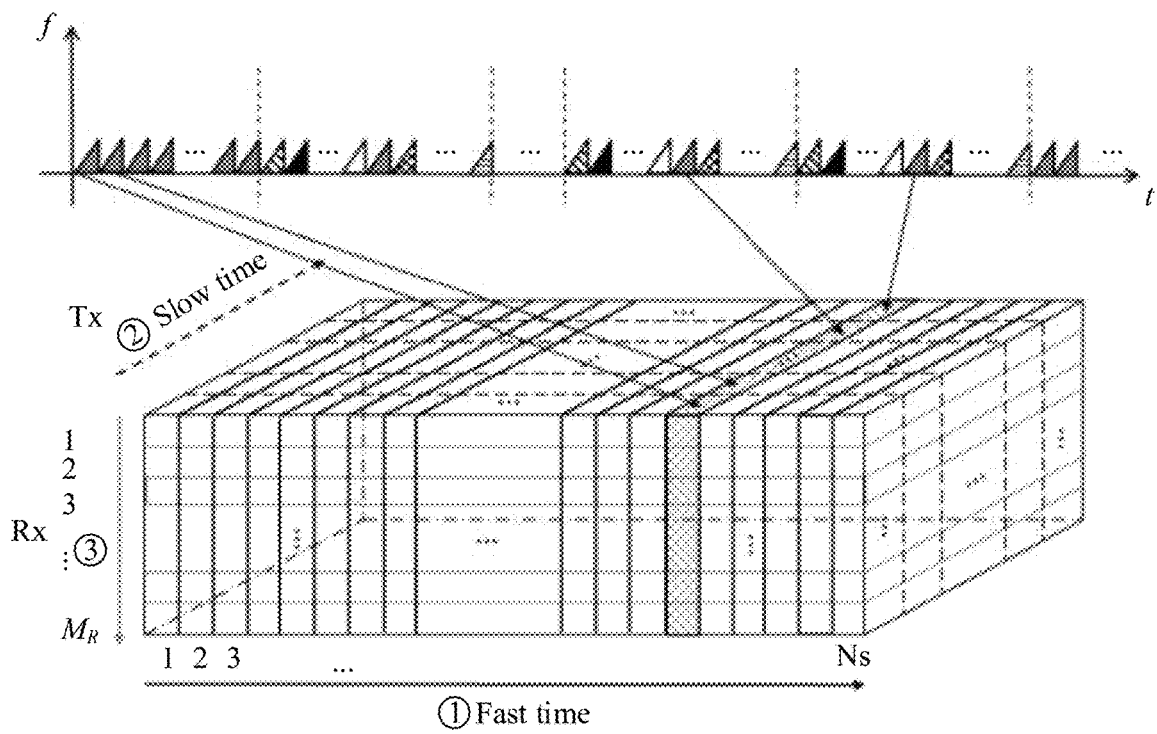
FIG. 8 is a schematic diagram of a data sampling manner according to Embodiment 3 of the present disclosure.

A data sampling manner may be shown in FIG. 8. A chirp signal is sampled in a fast sampling cycle $T_s$ in a fast time direction ①, and there are $N_s$ sampling points. In a slow time direction ②, all chirp signals transmitted by a transmit antenna in a single-antenna transmit mode sub-cycle in one TDM repetition cycle including one single-antenna transmit mode sub-cycle and a plurality of consecutive multi-antenna transmit mode sub-cycles are sequentially arranged. This is equivalent to that a sampling cycle in the slow time direction is the frequency sweep cycle $T_c$. Sampling signals on all receive antennas are sequentially arranged in a receive antenna arrangement direction ③, and the receive antennas may be sequentially arranged based on an antenna sequence or randomly arranged. In Embodiment 3, during velocity measurement, performing sampling at a two-dimensional sampling point with a gray grid pattern is equivalent to "for a received signal received by each of the plurality of antennas, sampling a chirp signal in one of the one or more TDM repetition cycles by using the frequency sweep cycle as a sampling cycle, to obtain data corresponding to N+L sampling points, where the N+L sampling points are respectively in the N frequency sweep cycles in the single-antenna transmit mode sub-cycle and the $K^{th}$ frequency sweep cycle in each of the L consecutive multi-antenna transmit mode sub-cycles".

First, a phase relationship of a plurality of chirp signals received by each antenna in this embodiment is described. In a multi-antenna TDM manner for transmitted signals that is shown in the upper half of FIG. 9, it may be learned, according to the foregoing Formula 8, that a phase difference between sampling data obtained by sampling (as described in step 702) the plurality of chirp signals received by each antenna is shown in the lower half of FIG. 9.

Figure 10:
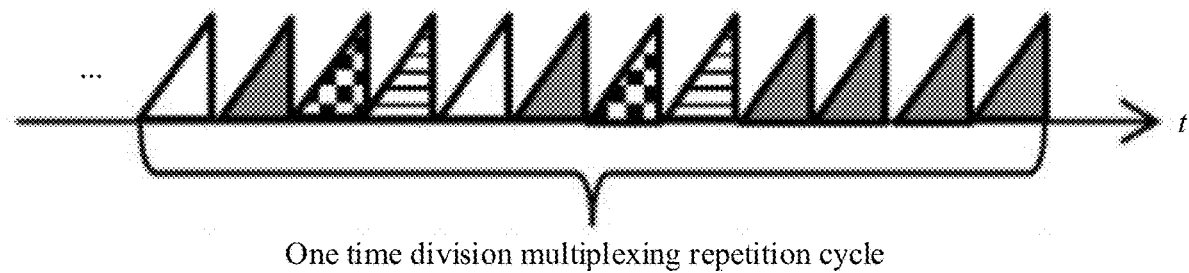
FIG. 10 is a schematic diagram of an example transmit antenna multiplexing manner for describing Embodiment 3 of the present disclosure.

The following describes a digital signal processing process in detail. For ease of description, a transmit antenna multiplexing manner shown in FIG. 10 is used as an example. One TDM repetition cycle includes two multi-antenna transmit mode sub-cycles and one single-antenna transmit mode sub-cycle. Four transmit antennas are used to sequentially send four chirp signals in each multi-antenna transmit mode sub-cycle, and the single-antenna transmit mode sub-cycle includes four chirp signals, which are located at the end of the entire TDM repetition cycle. It can be learned that six chirp signals are transmitted in one TDM repetition cycle by a transmit antenna in a single-antenna transmit mode sub-cycle. In an example, in step 702, data of six sampling points can be obtained for measurement signals received by each antenna that are shown in FIG. 10.

Figure 9:
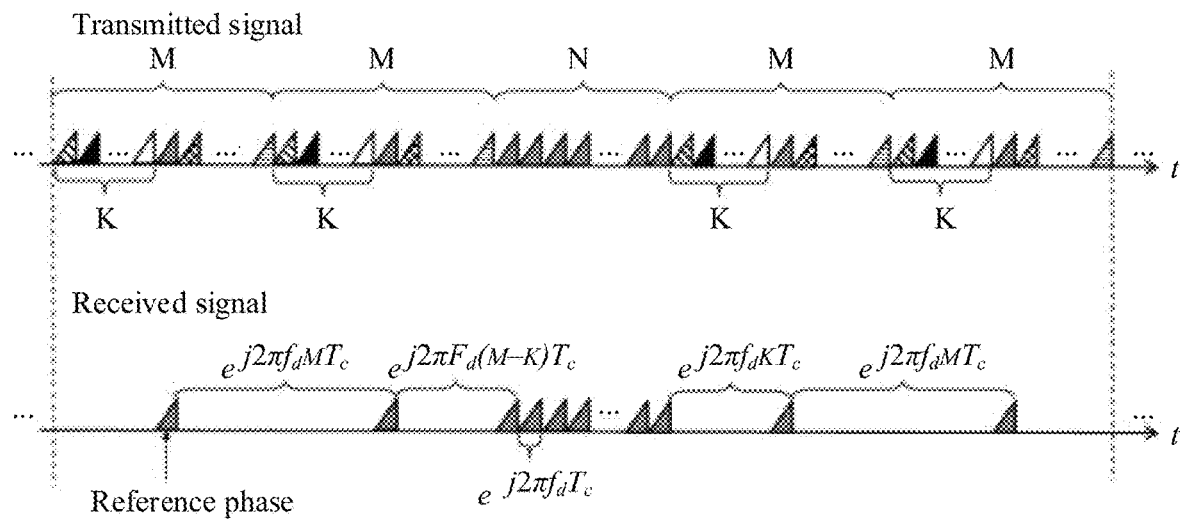
FIG. 9 is a schematic diagram of a phase relationship of a plurality of chirp signals received by each antenna according to Embodiment 3 of the present disclosure.

After the measurement signals in the transmit antenna multiplexing manner shown in FIG. 10 are reflected by the $k^{th}$ moving target, with reference to FIG. 9, it can be learned that a phase vector of six chirp signals sampled at a receive end is shown in Formula 10.

$$a_k = \left[1, e^{j2\pi f_{d_k} 4T_c}, e^{j2\pi f_{d_k} 7T_c}, e^{j2\pi f_{d_k} 8T_c}, \right. \quad \text{(Formula 10)}$$
$$\left. e^{j2\pi f_{d_k} 9T_c}, e^{j2\pi f_{d_k} 10T_c} \right]^T$$

A digit before the frequency sweep cycle Tc in Formula 10 is an exponential coefficient, and exponential coefficients of the phase vectors are [0, 4, 7, 8, 9, 10].

Step 703: Construct a target vector by using the data corresponding to the N+L sampling points corresponding to each of the plurality of antennas.

A received signal of the $n^{th}$ receive antenna may be represented as shown in Formula 11.

$$x_n = \sum_{k=1}^{K} a_k \rho_k e^{j\frac{4\pi \gamma n r_k}{c}} + n_n = As_n + n_n \quad \text{(Formula 11)}$$

In the formula, $$A = [a_1, \ldots, a_K], s_n = \left[\rho_1 e^{j\frac{4\pi\gamma n r_1}{c}}, \ldots, \rho_K e^{j\frac{4\pi\gamma n r_K}{c}}\right]^T,$$

$n_n$ is noise, $\rho_k$ is a signal amplitude, and $r_k$ is a distance from the $k^{th}$ target.

Step 704: Construct a target matrix X by using a plurality of target vectors of the plurality of antennas.

A matrix including received data of $M_R$ receive antennas may be denoted as:

$$X=[x_1, \ldots, x_{M_R}]=AS+N \quad \text{(Formula 12)},$$

where $S=[s_1, \ldots, s_{M_R}]$, $N=[n_1, \ldots, n_{M_R}]$.

Step 705: Calculate a covariance matrix R of the target matrix X.

$$R=XX^H \quad \text{(Formula 13)}$$

The $(m, n)^{th}$ element in the matrix R is shown below.

$$r_{m,n} = \sum_{k=1}^{K} \rho_k^2 e^{j2\pi f_{d_k}(m-n)T_c} \quad \text{(Formula 14)}$$

When the exponential coefficients of $a_k$ are [0, 4, 7, 8, 9, 10], distribution of exponential coefficients of elements in the matrix R is as follows.

TABLE 1

| 0 | −4 | −7 | −8 | −9 | −10 |
|---|---|---|---|---|---|
| 4 | 0 | −4 | −4 | −5 | −6 |
| 7 | 3 | 0 | −1 | −2 | −3 |
| 8 | 4 | 1 | 0 | −1 | −2 |
| 9 | 5 | 2 | 1 | 0 | −1 |
| 10 | 6 | 3 | 2 | 1 | 0 |

Step 706: Sequentially extract a plurality of elements in the matrix R in an order of exponential coefficients of the plurality of elements, and form a vector r by using the plurality of elements. If at least two of the plurality of elements correspond to a same exponential coefficient, an average value of the at least two elements is calculated as an element for forming the vector r. Alternatively, one of the at least two elements is selected as an element for forming the vector r.

For example, 21 elements are selected from the elements whose exponential coefficients range from −10 to 10 in the matrix R, and are arranged in ascending order or descending order to form a vector r whose length is 21. There are two elements whose exponential coefficients are 4 in the foregoing table, such as, the element (2, 1) and the element (4, 2). In this case, an element corresponding to the exponential coefficient 4 in the vector r may be either of the element (2, 1) and the element (4, 2), or may be an average value of the element (2, 1) and the element (4, 2).

Step 707: Calculate a velocity spectrum about moving velocities of the one or more targets based on the vector r. In an example, the velocity spectrum about the moving velocities of the one or more targets may be calculated by using a FFT, DBF, or MUSIC algorithm.

According to the measurement signal receiving method described in this embodiment, a maximum velocity measurement range can be increased and entire velocity measurement signal duration can be minimized while a relatively large virtual aperture is retained. In an example in which the measurement signals shown in FIG. 10 are received, a maximum velocity estimation range obtained in this embodiment is the same as that in the SIMO mode, that is, a maximum velocity measurement range competitive to the SIMO mode is achieved. In addition, a length requirement on the single-antenna transmit mode sub-cycle is low, and duration of the TDM repetition cycle is relatively short.

Figure 11:
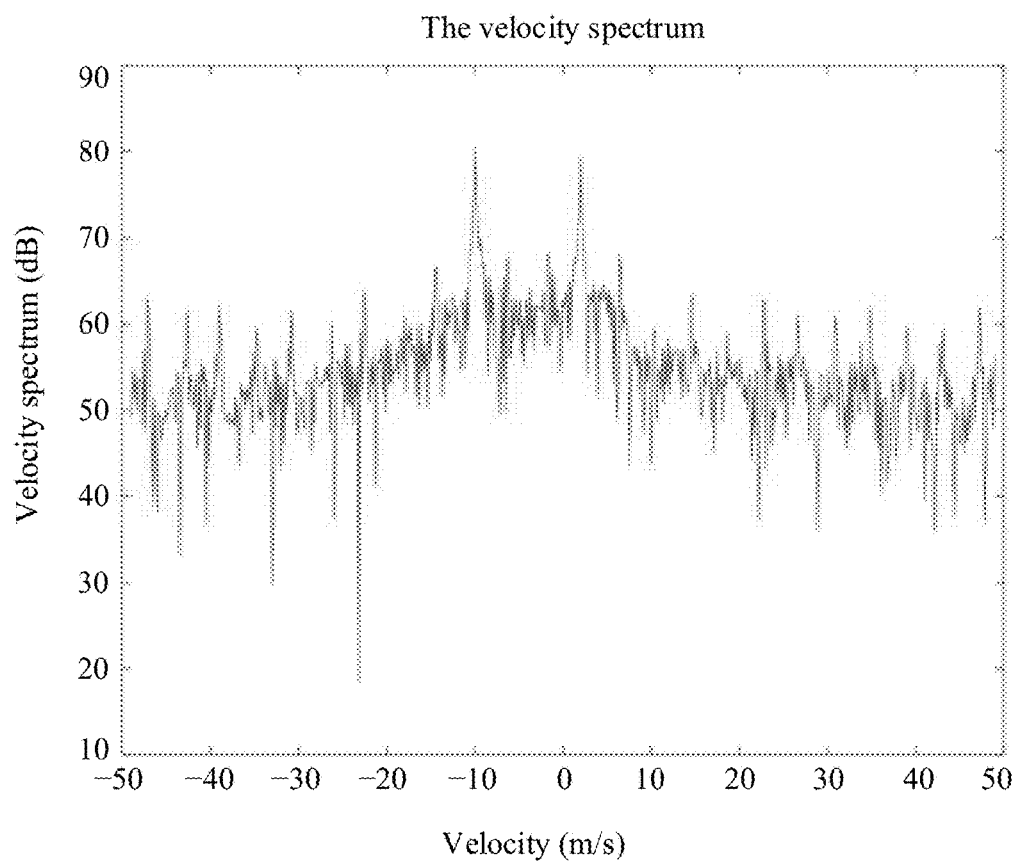
FIG. 11 is an example simulation effect diagram of a velocity spectrum according to Embodiment 3 of the present disclosure.

FIG. 11 is a simulation effect diagram of the velocity spectrum obtained based on the velocity measurement signal receiving method provided in Embodiment 3 of the present disclosure. A horizontal axis represents a moving velocity, and a vertical axis represents a velocity spectrum at a corresponding moving velocity. It can be learned that two spectral line peaks appear at two velocities such as −10 meters per second (m/s) and 2 m/s. This indicates that there are two moving targets whose moving velocities are respectively −10 m/s and 2 m/s.

The velocity measurement signal receiving method described in Embodiment 3 of the present disclosure may further be combined with distance measurement to obtain radio detection information such as an RD-map that reflects both a velocity and a distance of a moving target. An operation method is as follows.

Before step 702 in Embodiment 3, fast sampling is first performed in the fast sampling cycle Ts in the fast time direction ① shown in FIG. 8, to obtain Ns fast sampling points, and time domain to frequency domain conversion such as FFT is performed on the Ns fast sampling points, to obtain Ns pieces of fast sampling frequency domain data. In other words, in this step, data in the fast time direction ① in FIG. 8 is successively the Ns pieces of fast sampling frequency domain data.

The data corresponding to the N+L sampling points in step 702 is fast sampling frequency domain data corresponding to the N+L sampling points. In step 702, N+L slow sampling points are sequentially set to select the first to the $N_s^{th}$ of the $N_s$ pieces of fast sampling frequency domain data. In an example, step 703 to step 707 are sequentially performed $N_s$ times, to obtain a velocity spectrum corresponding to each of the Ns pieces of fast sampling frequency domain data.

Figure 12:
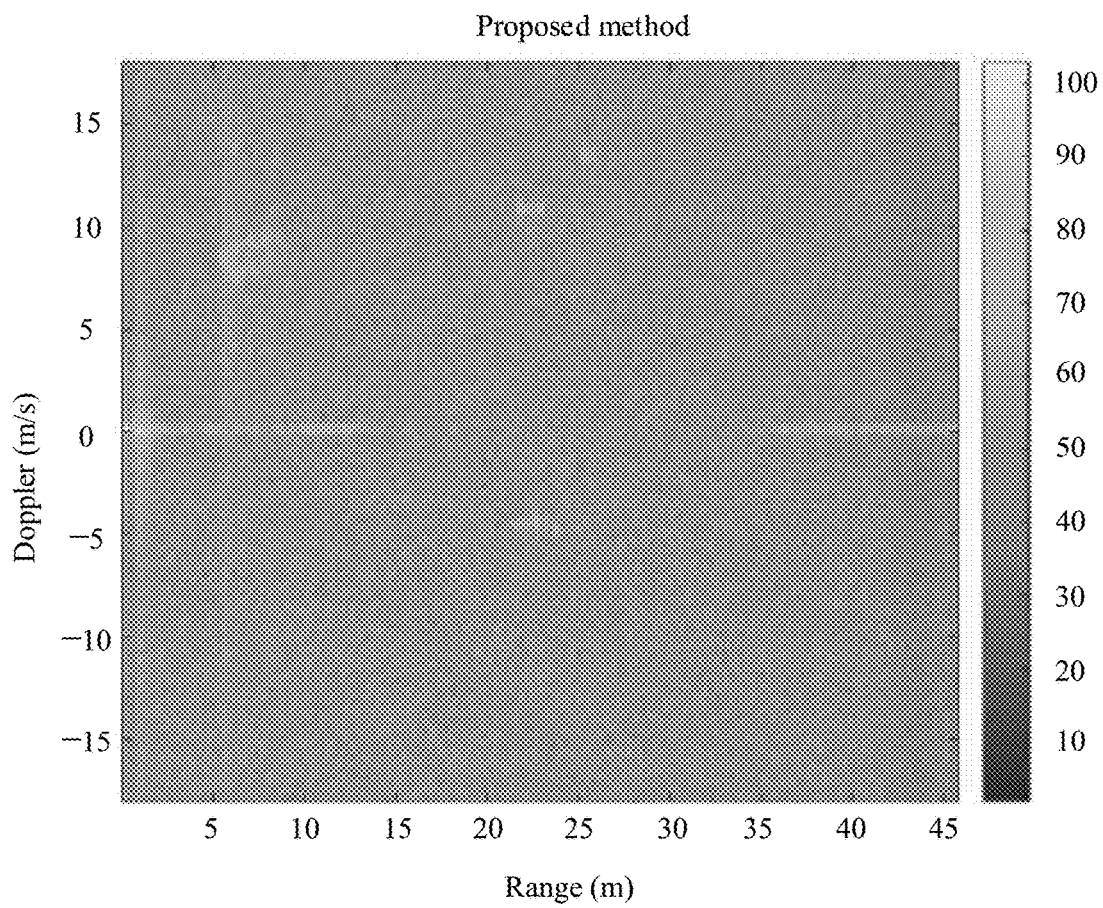
FIG. 12 is an example RD-map of actual velocity measurement according to Embodiment 3 of the present disclosure.

Distances of the one or more targets can be calculated based on the Ns pieces of fast sampling frequency domain data. Therefore, with reference to the velocity spectrum corresponding to each of the Ns pieces of fast sampling frequency domain data, the RD-map that can comprehensively reflect distance-velocity information can be formed. With reference to FIG. 12, a bright color part represents one or more measured moving targets, a horizontal axis is a Range axis and is used to indicate the distances of the one or more moving targets, and a vertical axis is a Doppler axis and is used to indicate the moving velocities of the one or more moving targets. It should be noted that the RD-map can be obtained in this manner only when the velocity measurement signal is a chirp signal whose frequency changes linearly with time.

Embodiment 4 of the present disclosure provides a velocity measurement signal transmission apparatus. The transmission apparatus 13 in FIG. 13 includes the following modules such as a measurement signal generation module 1301 configured to generate a plurality of chirp signals for measuring moving velocities of one or more moving targets; and a transmission module 1302 configured to transmit the plurality of chirp signals in a TDM repetition cycle by using M antennas.

The TDM repetition cycle includes one single-antenna transmit mode sub-cycle and L consecutive multi-antenna transmit mode sub-cycles. The single-antenna transmit mode sub-cycle includes N frequency sweep cycles of the chirp signals, and chirp signals in the N frequency sweep cycles are transmitted by one of the M antennas, or are simultaneously transmitted by at least two of the M antennas, where there is a delay between the at least two antennas. Each multi-antenna transmit mode sub-cycle includes M frequency sweep cycles of the chirp signals, and chirp signals in the M frequency sweep cycles are respectively transmitted in order by the M antennas. The transmit antenna in the single-antenna transmit mode sub-cycle always transmits the $(K+1)^{th}$ chirp signal in the multi-antenna transmit mode sub-cycle. M and N are integers greater than 1, L is a positive integer, and K is an integer greater than or equal to 0.

The delay between the at least two antennas is a relatively low delay, is preferably an integer multiple of a fast sampling cycle Ts, and is used to offset a signal transmission path length difference caused by an antenna position difference, so that simultaneously transmitting velocity measurement signals by the at least two antennas can be considered, in terms of effect, as transmitting the velocity measurement signals by one antenna. This avoids an FOV (Field of View, field of view) decrease caused by an undesired BF (Beamforming, beamforming) effect, and greatly increases an SNR (Signal to Noise Ratio, signal to noise ratio).

The order includes a preset order or a randomly generated order, and orders in the L multi-antenna transmit mode sub-cycles are the same.

The four parameters M, N, L, and K may be optimized, or a limitation on a time interval between the single-antenna transmit mode sub-cycle and the multi-antenna transmit mode sub-cycle may be properly set, to increase a maximum velocity measurement range as much as possible while a relatively large virtual aperture is retained. Embodiment 4 includes the following several preferred setting manners.

In a first manner, a ratio of N to L is greater than a first threshold. A value of the first threshold should ensure that no obvious target ambiguity caused due to undersampling of a slow sampling part in a Doppler dimension occurs in a target part of a Doppler profile (Doppler Profile).

In a second manner, values of L, M, and N should ensure that a ratio of a quantity of 0s to a quantity of non-0 values in a weight function w does not exceed a second threshold, the weight function w=c⊗c⁻, c is a vector that includes N+L×M elements, c⁻ represents vector inversion of c, ⊗ represents a linear convolution operation of the vector, the N+L×M elements correspond to transmit antennas of N+L×M chirp signals in one TDM repetition cycle, an element corresponding to a transmit antenna in the single-antenna transmit mode sub-cycle is 1, and elements corresponding to the other M−1 antennas than the transmit antenna in the single-antenna transmit mode sub-cycle are 0s.

In a third manner, a time interval between the single-antenna transmit mode sub-cycle and the multi-antenna transmit mode sub-cycle is zero, or is an integer multiple of the frequency sweep cycle.

In a fourth manner, a relationship among M, N, and K satisfies the following.

if $K=0, N \geq M-1$;

if $0<K \leq M, N \geq M$; or if $K>M, N \geq K+1$.

According to the foregoing transmission apparatus in which SIMO and MIMO are combined, a maximum velocity measurement range can be increased and entire velocity measurement signal duration can be minimized while a relatively large virtual aperture is retained in Embodiment 4 of the present disclosure.

Figure 13:
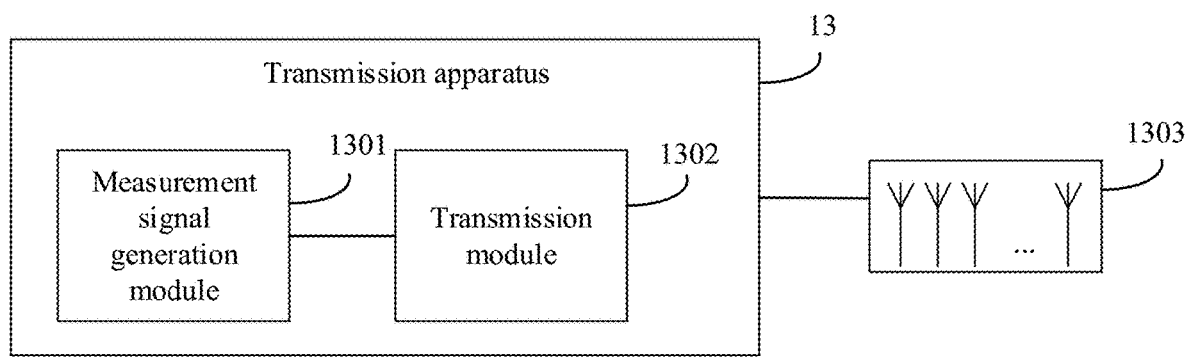
FIG. 13 is a block diagram of a structure of a vehicle/radar including a velocity measurement signal transmission apparatus according to Embodiment 4 of the present disclosure.

The velocity measurement signal transmission apparatus provided in Embodiment 4 of the present disclosure may be used in a vehicle or a radar. With reference to FIG. 13, the vehicle or the radar further includes a plurality of transmit antennas 1303. The transmission module 1302 in the transmission apparatus 13 transmits the plurality of chirp signals in the TDM repetition cycle by using the plurality of transmit antennas 1303. The radar includes but is not limited to a millimeter wave radar, a laser radar, and an ultrasonic radar.

Embodiment 5 of the present disclosure provides a velocity measurement signal transmission apparatus. The transmission apparatus 14 in FIG. 14 includes a memory 1401 and a processor 1402. The memory 1401 stores computer program instructions, and the processor 1402 runs the computer program instructions to perform the velocity measurement signal transmission method described in Embodiment 1 or Embodiment 2 shown in FIG. 3. The processor 1402 includes but is not limited to various types of CPUs, DSPs, microcontrollers, microprocessors, or artificial intelligence processors.

Figure 14:
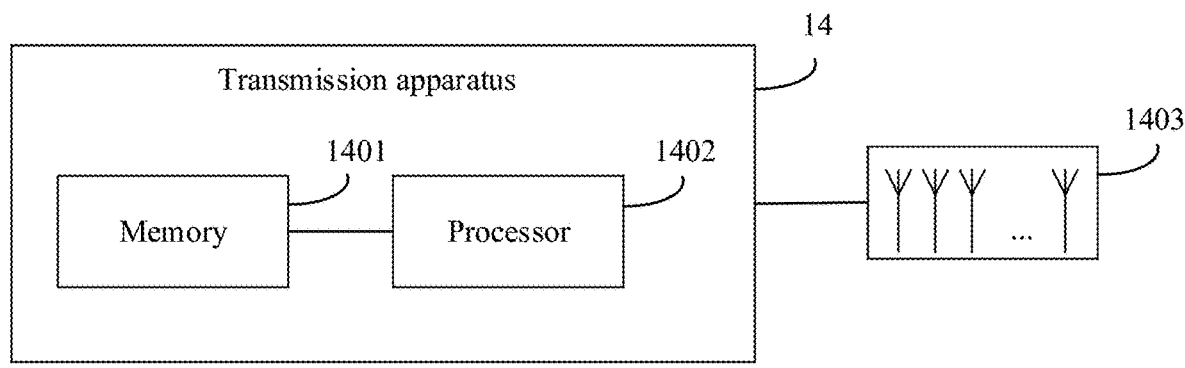
FIG. 14 is a block diagram of a structure of a vehicle/radar including a velocity measurement signal transmission apparatus according to Embodiment 5 of the present disclosure.

The velocity measurement signal transmission apparatus provided in Embodiment 5 of the present disclosure may be used in a vehicle or a radar. With reference to FIG. 14, the vehicle or the radar further includes a plurality of transmit antennas 1403 configured to transmit, in a TDM repetition cycle, a plurality of chirp signals fed from the transmission apparatus 14. The radar includes but is not limited to a millimeter wave radar, a laser radar, and an ultrasonic radar.

Embodiment 6 of the present disclosure provides a velocity measurement signal receiving apparatus. The receiving apparatus 15 in FIG. 15 includes the following modules such as a receiving module 1501 configured to receive, by using a plurality of antennas, received signals reflected by one or more moving targets, where the received signals include chirp signals in one or more TDM repetition cycles, each TDM repetition cycle includes one single-antenna transmit mode sub-cycle and L consecutive multi-antenna transmit mode sub-cycles, each single-antenna transmit mode sub-cycle includes N frequency sweep cycles, each multi-antenna transmit mode sub-cycle includes M frequency sweep cycles, and N chirp signals in the N frequency sweep cycles and a chirp signal in the Kth frequency sweep cycle in the M frequency sweep cycles are transmitted by a same antenna, where L, M, N, and K are all positive integers, and both M and N are greater than 1; a data obtaining module 1502 configured to, for a received signal received by each of the plurality of antennas, sample a chirp signal in one of the one or more TDM repetition cycles by using the frequency sweep cycle as a sampling cycle, to obtain data corresponding to N+L sampling points, where the N+L sampling points are respectively in the N frequency sweep cycles in the single-antenna transmit mode sub-cycle and the Kth frequency sweep cycle in each of the L consecutive multi-antenna transmit mode sub-cycles; a target vector construction module 1503 configured to construct a target vector by using the data corresponding to the N+L sampling points corresponding to each of the plurality of antennas; a target matrix construction module 1504 configured to construct a target matrix X by using a plurality of target vectors of the plurality of antennas; a covariance calculation module 1505 configured to calculate a covariance matrix R of the target matrix X; a vector construction module 1506 configured to sequentially extract a plurality of elements in the matrix R in an order of exponential coefficients of the plurality of elements, and form a vector r by using the plurality of elements; and a velocity spectrum calculation module 1507 configured to calculate a velocity spectrum about moving velocities of the one or more targets based on the vector r. In the velocity measurement signal receiving apparatus with the foregoing structure, a maximum velocity measurement range can be increased and entire velocity measurement signal duration can be minimized while a relatively large virtual aperture is retained.

The calculating a velocity spectrum about moving velocities of the targets based on the vector r includes calculating the velocity spectrum about the moving velocities of the one or more targets based on the vector r by using an FF), DBF, or a MUSIC algorithm.

The forming a vector r by using the plurality of elements includes, if at least two of the plurality of elements correspond to a same exponential coefficient, calculating an average value of the at least two elements as an element for forming the vector r, or selecting one of the at least two elements as an element for forming the vector r.

Figure 15:
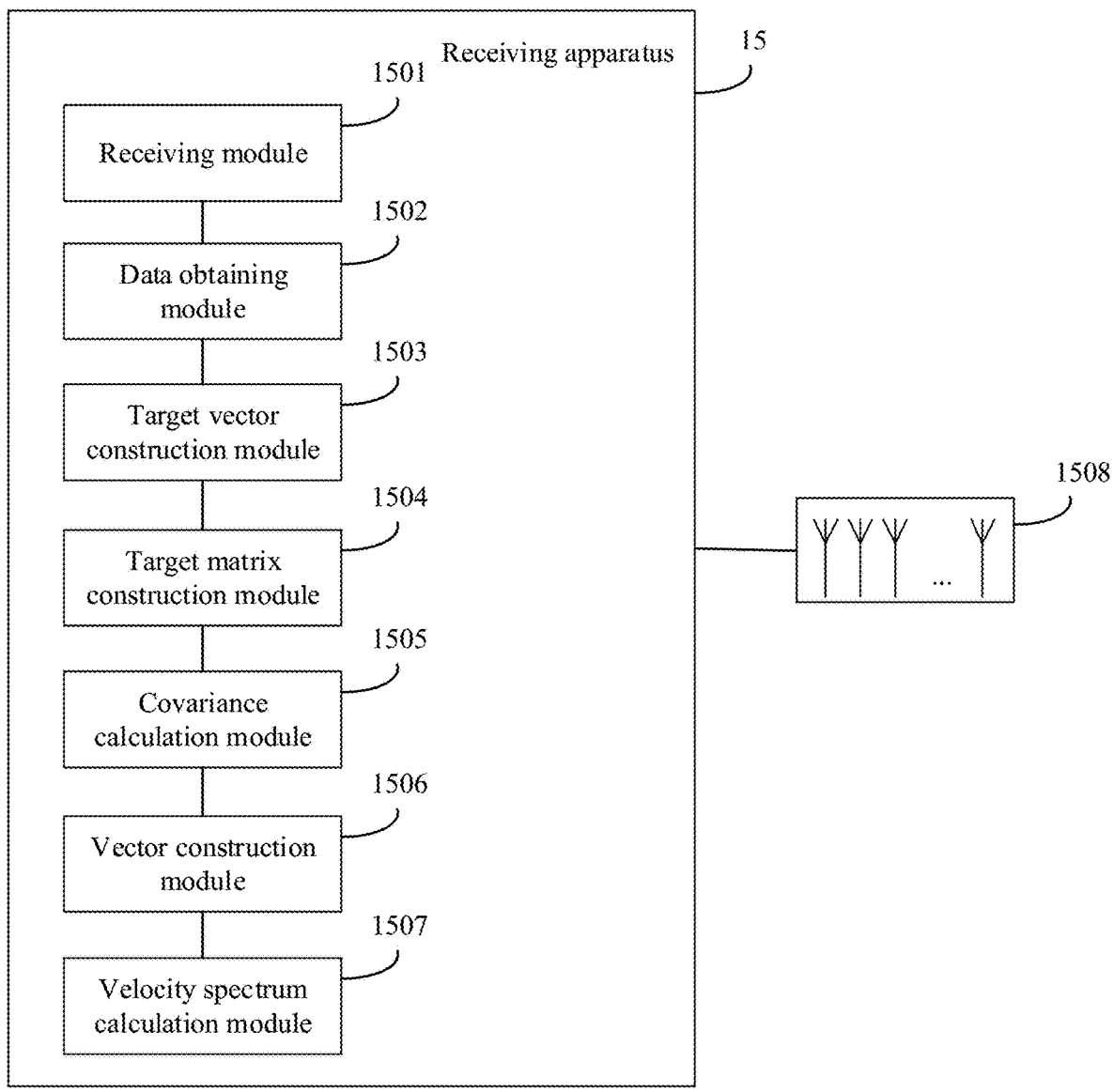
FIG. 15 is a block diagram of a structure of a vehicle/radar including a velocity measurement signal receiving apparatus according to Embodiment 6 of the present disclosure.

The velocity measurement signal receiving apparatus provided in Embodiment 6 of the present disclosure may be used in a vehicle or a radar. With reference to FIG. 15, the vehicle or the radar further includes a plurality of receive antennas 1508, and the receiving module 1501 in the receiving apparatus 15 receives, by using the plurality of receive antennas 1508, the received signal reflected by the one or more moving targets. The radar includes but is not limited to a millimeter wave radar, a laser radar, and an ultrasonic radar. One or more of the modules in the foregoing Embodiment 4 and Embodiment 6 may be implemented by software, hardware, firmware, or a combination thereof. The software or firmware includes but is not limited to computer program instructions or code, and may be executed by a hardware processor. The hardware includes but is not limited to various integrated circuits, for example, a central processing unit (CPU), a digital signal processor (DSP), a field-programmable gate array (FPGA), or an application-specific integrated circuit (ASIC).

Embodiment 7 of the present disclosure provides a velocity measurement signal receiving apparatus. The receiving apparatus 16 in FIG. 16 includes a memory 1601 and a processor 1602. The memory 1601 stores computer program instructions, and the processor 1602 runs the computer program instructions to perform the velocity measurement signal receiving method described in Embodiment 3 shown in FIG. 7. The processor 1602 includes but is not limited to various types of CPUs, DSPs, microcontrollers, microprocessors, or artificial intelligence processors.

Figure 16:
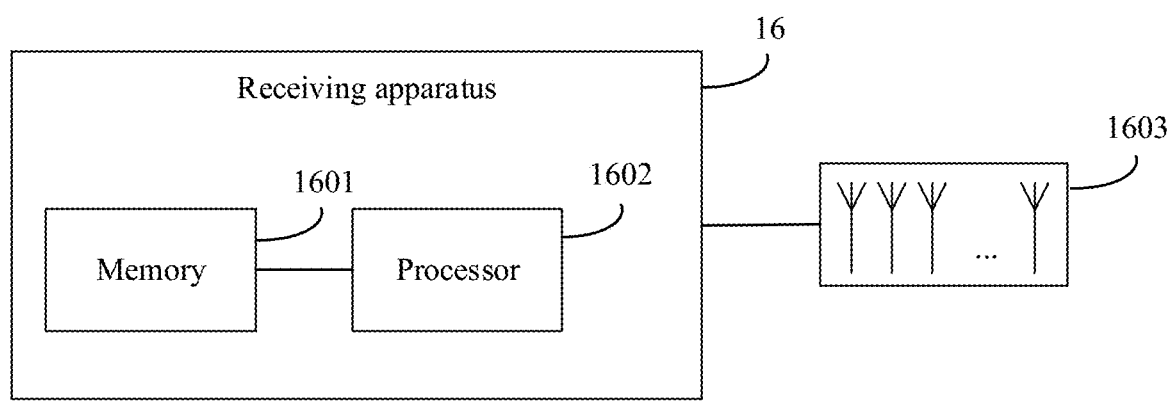
FIG. 16 is a block diagram of a structure of a vehicle/radar including a velocity measurement signal receiving apparatus according to Embodiment 7 of the present disclosure.

The velocity measurement signal receiving apparatus provided in Embodiment 7 of the present disclosure may be used in a vehicle or a radar. With reference to FIG. 16, the vehicle or the radar further includes a plurality of receive antennas 1603 configured to receive a received signal reflected by one or more moving targets, and provide the received signal for the receiving apparatus 16. The radar includes but is not limited to a millimeter wave radar, a laser radar, and an ultrasonic radar.

All the foregoing embodiments of the present disclosure may be applied to an intelligent driving tool with a velocity measurement requirement, such as a motor vehicle, a non-motor vehicle, a train, or an aircraft, or may be applied to a device with a velocity measurement function, such as a radar or a sensor. Application scenarios include but are not limited to assisted driving and unmanned driving.

A person skilled in other approaches may understand that, descriptions of embodiments provided in this application may be mutually referenced. For ease and brevity of description, for example, for functions of the apparatuses and devices and performed steps that are provided in embodiments of this application, refer to related descriptions in the method embodiments of this application. Reference can also be made between various method embodiments and between various apparatus embodiments.

A person skilled in the art may understand that all or some of the steps of the method embodiments may be implemented by using hardware related to a program instruction. The program may be stored in a computer-readable storage medium. When the program is run, the steps of the method embodiments are performed. The foregoing storage medium includes various media that can store program code, such as a ROM, a RAM, a magnetic disk, or an optical disc.

All or some of the foregoing embodiments may be implemented through software, hardware, firmware, or any combination thereof. When software is used for implementation, the embodiments may be implemented completely or partially in a form of a computer program product. The computer program product includes one or more computer instructions. When the computer program instructions are loaded and executed on a computer, the procedures or functions according to the embodiments of the present disclosure are all or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

In several embodiments provided in this application, it should be understood that the disclosed apparatus and method may be implemented in other manners without departing from the scope of this application. For example, the embodiments described above are merely examples. For example, division into the modules or units is merely logical function division, and may be other division in an actual implementation. For example, a plurality of units or components may be combined or integrated into another system, or some features may be ignored or not performed. The units described as separate parts may or may not be physically separate, and parts displayed as units may or may not be physical units, and may be located in one position, or may be distributed on a plurality of network units. Some or all of the modules may be selected according to an actual requirement to achieve the objectives of the solutions of the embodiments. A person of ordinary skill in the art may understand and implement the embodiments without creative efforts.

In addition, the apparatus and method described herein, and schematic diagrams of different embodiments can be combined or integrated with other systems, modules, technologies, or methods without departing from the scope of this application. In addition, the displayed or discussed mutual couplings or direct couplings or communication connections may be implemented through some interfaces. The indirect couplings or communication connections between the apparatuses or units may be implemented in electronic, mechanical, or another form.

The foregoing descriptions are merely implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A velocity measurement signal transmission method, comprising:
   generating a plurality of chirp signals; and
   transmitting the plurality of chirp signals in a time-division multiplexing (TDM) repetition cycle using M antennas,
   wherein the TDM repetition cycle comprises a single-antenna transmit mode sub-cycle and L consecutive multi-antenna transmit mode sub-cycles,
   wherein the single-antenna transmit mode sub-cycle comprises N frequency sweep cycles,
   wherein transmitting the chirp signals further comprises transmitting N chirp signals of the chirp signals in the N frequency sweep cycles by one of the M antennas or simultaneously transmitting the N chirp signals by at least two of the M antennas,
   wherein there is a delay between at least two of the M antennas,
   wherein each multi-antenna transmit mode sub-cycle of the L consecutive multi-antenna transmit mode sub-cycles comprises M frequency sweep cycles,
   wherein M chirp signals of the chirp signals in the M frequency sweep cycles are respectively transmitted in order by the M antennas,
   wherein M and N are positive integers greater than 1, and wherein L is a positive integer.

2. The velocity measurement signal transmission method of claim 1, wherein a ratio of N to L is greater than a first threshold.

3. The velocity measurement signal transmission method of claim 1, wherein values of L, M, and N cause a ratio of a quantity of 0 values to a quantity of non-0 values in a weight function w to not exceed a second threshold, wherein the weight function $w=c \otimes c^-$, wherein c is a vector that comprises N+L×M elements, wherein $c^-$ represents vector inversion of c, wherein $\otimes$ represents a linear convolution operation of the vector, wherein the N+L×M elements correspond to transmit antennas in the M antennas of N+L×M chirp signals in one TDM repetition cycle starting from the single-antenna transmit mode sub-cycle or the L consecutive multi-antenna transmit mode sub-cycles, wherein an element corresponding to a first transmit antenna of the M transmit antennas in the single-antenna transmit mode sub-cycle is 1, and wherein elements corresponding to the other M−1 antennas other than the first transmit antenna are zero values.

4. The velocity measurement signal transmission method of claim 2, wherein values of the L, the M, and the N cause a ratio of a quantity of zero values to a quantity of non-0 values in a weight function w does to not exceed a second threshold, wherein the weight function $w=c \otimes c^-$, wherein c is a vector that comprises N+L×M elements, wherein $c^-$ represents vector inversion of c, wherein $\otimes$ represents a linear convolution operation of the vector, wherein the N+L×M elements correspond to transmit antennas in the M antennas of N+L×M chirp signals in one TDM repetition cycle starting from the single-antenna transmit mode sub-cycle or the L consecutive multi-antenna transmit mode sub-cycles, wherein an element corresponding to a first transmit antenna of the M transmit antennas in the single-antenna transmit mode sub-cycle is 1, and wherein elements corresponding to the other M−1 antennas other than the first transmit antenna are 0 values.

5. The velocity measurement signal transmission method of claim 1, wherein a time interval between the single-antenna transmit mode sub-cycle and the multi-antenna transmit mode sub-cycle is zero; or is an integer multiple of the M frequency sweep cycles or the N frequency sweep cycles.

6. The velocity measurement signal transmission method of claim 2, wherein a time interval between the single-antenna transmit mode sub-cycle and the each multi-antenna transmit mode sub-cycle is zero; or is an integer multiple of the M frequency sweep cycles or the N frequency sweep cycles.

7. The velocity measurement signal transmission method of claim 3, wherein a time interval between the single-antenna transmit mode sub-cycle and the each multi-antenna transmit mode sub-cycle is zero, or is an integer multiple of the M frequency sweep cycles or the N frequency sweep cycles.

8. The velocity measurement signal transmission method of claim 1, wherein a first transmit antenna in the single-antenna transmit mode sub-cycle transmits the $(K+1)^{th}$ chirp signal in the multi-antenna transmit mode sub-cycle, wherein K is an integer greater than or equal to 0, and wherein a relationship among M, N, and K satisfies one of the following:

if $K=0, N \geq M-1$;

if $0 < K \leq M, N \geq M$; or if $K > M, N \geq K+1$.

9. A signal transmission apparatus, comprising:
   a memory configured to store instructions; and
   a processor coupled to the memory and configured to execute the instructions to cause the signal transmission apparatus to:
   generate a plurality of chirp signals; and
   transmit the plurality of chirp signals in a time division multiplexing (TDM) repetition cycle using M antennas,
   wherein the TDM repetition cycle comprises a single-antenna transmit mode sub-cycle and L consecutive multi-antenna transmit mode sub-cycles,
   wherein the single-antenna transmit mode sub-cycle comprises N frequency sweep cycles,
   wherein the signal transmission apparatus is configured to transmit N chirp signals of the chirp signals in the N frequency sweep cycles by one of the M antennas or simultaneously transmit the N chirp signals by at least two of the M antennas,
   wherein there is a delay between the at least two antennas,
   wherein each multi-antenna transmit mode sub-cycle of the L consecutive multi-antenna transmit mode sub-cycles comprises M frequency sweep cycles, wherein M chirp signals of the chirp signals in the M frequency sweep cycles are respectively transmitted in order by the M antennas, and wherein M and N are positive integers greater than 1, and L is a positive integer.

10. The signal transmission apparatus of claim 9, wherein a ratio of N to L is greater than a first threshold.

11. The signal transmission apparatus of claim 9, wherein values of L, M, and N cause a ratio of a quantity of 0 values to a quantity of non-0 values in a weight function w to not exceed a second threshold, wherein the weight function $w=c \otimes c^-$, wherein c is a vector that comprises N+L×M elements, wherein $c^-$ represents vector inversion of c, wherein $\otimes$ represents a linear convolution operation of the vector, wherein the N+L×M elements correspond to transmit antennas in the M antennas of N+L×M chirp signals in one TDM repetition cycle starting from the single-antenna transmit mode sub-cycle or the L consecutive multi-antenna transmit mode sub-cycles, wherein an element corresponding to a first transmit antenna of the M transmit antennas in the single-antenna transmit mode sub-cycle is 1, and wherein elements corresponding to the other M−1 antennas other than the first transmit antenna are 0 values.

12. The signal transmission apparatus of claim 10, wherein values of the L, the M, and the N cause a ratio of a quantity of 0 values to a quantity of non-0 values in a weight function w to not exceed a second threshold, wherein the weight function $w=c \otimes c^-$, wherein c is a vector that comprises N+L×M elements, wherein $c^-$ represents vector inversion of c, wherein $\otimes$ represents a linear convolution operation of the vector, wherein the N+L×M elements correspond to transmit antennas in the M antennas of N+L×M chirp signals in one TDM repetition cycle starting from the single-antenna transmit mode sub-cycle or the L consecutive multi-antenna transmit mode sub-cycles, wherein an element corresponding to a first transmit antenna of the M transmit antennas in the single-antenna transmit mode sub-cycle is 1, and wherein elements corresponding to the other M−1 antennas other than the first transmit antenna are 0 values.

13. The signal transmission apparatus of claim 9, wherein a time interval between the single-antenna transmit mode sub-cycle and the multi-antenna transmit mode sub-cycle is zero, or is an integer multiple of the M frequency sweep cycles or the N frequency sweep cycles.

14. The signal transmission apparatus of claim 10, wherein a time interval between the single-antenna transmit mode sub-cycle and the each multi-antenna transmit mode sub-cycle is zero; or is an integer multiple of the M frequency sweep cycles or the frequency sweep cycles.

15. The signal transmission apparatus of claim 11, wherein a time interval between the single-antenna transmit mode sub-cycle and the each multi-antenna transmit mode sub-cycle is zero, or is an integer multiple of the M frequency sweep cycles or the N frequency sweep cycles.

16. The signal transmission apparatus of claim 9, wherein a first transmit antenna in the single-antenna transmit mode sub-cycle transmits the $(K+1)^{th}$ chirp signal in the multi-antenna transmit mode sub-cycle, wherein K is an integer greater than or equal to 0, and a relationship among M, N, and K satisfies one of the following:

if $K=0, N \geq M-1$;

if $0<K \leq M, N \geq M$; or if $K>M, N \geq K+1$.

* * * * *